United States Patent
Gädeken et al.

(10) Patent No.: US 7,124,227 B2
(45) Date of Patent: Oct. 17, 2006

(54) PROGRAMMABLE INTERFACE LINK LAYER DEVICE

(75) Inventors: Gralf Gädeken, Weinsberg (DE); Gerd Spalink, Stuttgart (DE)

(73) Assignee: SONY International (Europe) GmbH, Berlin (DE)

(*) Notice: Subject to any disclaimer, the term of this patent is extended or adjusted under 35 U.S.C. 154(b) by 426 days.

(21) Appl. No.: 10/278,493

(22) Filed: Oct. 23, 2002

(65) Prior Publication Data

US 2003/0084225 A1 May 1, 2003

(30) Foreign Application Priority Data

Oct. 25, 2001 (EP) ................................ 01 125 575

(51) Int. Cl.
 *G06F 13/00* (2006.01)
 *G06F 13/42* (2006.01)
 *G06F 13/14* (2006.01)

(52) U.S. Cl. ...................... 710/300; 710/104; 710/106; 710/305

(58) Field of Classification Search .............. 710/8–10, 710/33, 104–105, 305–306, 311; 709/218, 709/222

See application file for complete search history.

(56) References Cited

U.S. PATENT DOCUMENTS

| | | | | |
|---|---|---|---|---|
| 4,916,692 A * | 4/1990 | Clarke et al. | ................. | 370/451 |
| 6,512,767 B1 * | 1/2003 | Takeda et al. | ............... | 370/389 |
| 6,772,267 B1 * | 8/2004 | Thaler et al. | ................. | 710/306 |
| 6,807,148 B1 * | 10/2004 | Eicher | ........................ | 370/217 |
| 2001/0001323 A1 * | 5/2001 | Jeddeloph | .................. | 711/104 |
| 2001/0023452 A1 * | 9/2001 | Spalink et al. | .............. | 709/232 |
| 2002/0041607 A1 * | 4/2002 | Spalink | ..................... | 370/503 |

FOREIGN PATENT DOCUMENTS

| | | |
|---|---|---|
| EP | 0 848 568 | 6/1998 |
| EP | 1 113 626 | 7/2001 |
| EP | 1 133 108 | 9/2001 |
| EP | 1255377 A1 * | 11/2002 |
| EP | 1307005 A1 * | 5/2003 |

OTHER PUBLICATIONS

Nyu, Takayuki. "Modified Tree-ID Process for Long-haul Transmission and Long PHY_DELAY". C&C Media Research Laboratories. NEC Corporation. Sep. 1997.*

* cited by examiner

*Primary Examiner*—Mark H. Rinehart
*Assistant Examiner*—Thomas J. Cleary
(74) *Attorney, Agent, or Firm*—Oblon, Spivak, McClelland, Maier & Neustadt, P.C.

(57) ABSTRACT

An interface link layer device is connected in-between a first sub network and a long delay link to which at least one second sub network is connected. The interface link layer device comprises at least two storage areas, whereby new configuration data received via the long delay link is written to one of the storages to simulate the devices of the second network within the first network. In case a self ID phase is initiated as long as the configuration information is not complete yet, the respective other storage area is accessed. In case a self ID phase is initiated as soon as or after the new configuration data is complete, the storage area to which the new configuration data has been written is used for setting up the self ID packet.

20 Claims, 6 Drawing Sheets

PROGRAMMABLE INTERFACE LINK LAYER DEVICE

The invention is related to an interface link layer device for use in a device network comprising a long delay link, and to a method for maintaining a well-defined status in a device network.

The IEEE 1394 standard (in the following also referred to as 1394 standard) is one of the most common standards for interconnecting different devices, such as audio or video devices. Generally, networks according to the IEEE 1394 standard work only with nodes with short, direct interconnections, since very strict timing requirements, e.g. during the self identification phase (in the following self ID phase) have to be fulfilled.

The EP 0 848 568 A1 and the European Patent Application with the Application No. 99 126 221.3 which is filed by the Applicant of the present invention and herewith incorporated into this specification describe e.g. coaxial interfaces between two IEEE 1394 serial bus systems, i.e. sub networks, to build a distributed IEEE 1394 network.

The issue of integrating sub networks, which are interconnected by a long delay connection, into a transparent IEEE 1394 network is addressed in the European Patent Application No. 00104844.6, "Interface Link Layer Device for Long Delay Connections", which is filed by the Applicant of the present invention and herewith incorporated into this specification. According to the teaching of this application, different sub networks which are connected, via interface link layer devices, to a long delay connection, can be integrated into a distributed IEEE 1394 network whereby it is still possible to obey to the strict timing requirements of the IEEE 1394 standard.

In each of the sub networks, a first self ID phase is performed wherein each of the interface link layer devices behaves like a single node. The information about the configuration of a certain sub network is transmitted, via the long delay link, to all the interface link layer devices and sub networks connected to the long delay link. Each interface link layer device which received information about at least one other sub network initiates a second self ID phase, wherein the nodes of remote sub networks are simulated by said interface link layer device. This implies that the interface link layer device issues the required self ID packets of the simulated nodes to its own sub network. Thus, the strict timing requirements can be met.

If the network topology on one side, i.e. within one sub network, changes, the sub network on this side reconfigures itself by the standard IEEE 1394 mechanism and the new network topology information or further information required to properly simulate this sub network is transmitted to the other interface link layer device whereafter this other interface link layer device performs a new self ID phase within the connected sub network.

A bus reset to initiate a new self ID phase is always carried out in case a device is newly connected to an IEEE 1394 bus, removed therefrom or a device requests it. In case an interface link layer device receives network configuration information via the long delay link and during the transmission of this information, one of the devices of the interface link layer device's own sub network causes a bus reset, it is a problem how to reestablish a well-defined network status.

Therefore, it is an object of the invention to provide an interface link layer device for use in a device network and a method for performing a self ID phase such that a well-defined network status is maintained at each point of time.

The object of the invention is solved by an interface link layer device according to independent claim 1, by a device network according to independent claim 13, and by a method for maintaining a well-defined status in a device network according to independent claim 14. Preferred embodiments of the interface link layer device and the method according to the present invention are respectively defined in the respective following subclaims.

The inventive interface link layer device is connected in-between a first sub network and a long delay link to which at least one second sub network is connected. The interface link layer device comprises a physical layer for simulating nodes of said second sub network. Furthermore, the interface link layer device comprises at least first storage means and second storage means, whereby information received via the long delay link about the configuration of said second sub network is written to either one of said storage means. In case a self ID phase is initiated before said write access is completed, the content of the respective other storage means is used for setting up the self ID packets. In case a self ID phase is initiated as soon as or after the write access is completed, the content of the storage means to which said write access has been directed is used for setting up the self ID packets.

An interface link layer device with a programmable physical layer can simulate any number (according to the IEEE 1394 standard up to 62) of nodes. During a self ID phase, the storage means containing the valid self ID information are accessed, the self ID packets are set up and sent to the interface link layer device's own sub network.

According to the invention, at least two storage means are provided, with one of the storage means accumulating the new configuration data received via the long delay link, and with the respective other storage means containing the old configuration data. As long as the new configuration data is not complete, the old, complete configuration data is used in case of a bus reset for setting up the self ID packets. At a well-defined point of time, when the new configuration data has been completely received and stored, the new configuration data is valid data and can be used for setting up the self ID packets.

Thus, by utilizing at least two storage means, at each point of time a well-defined network status of the self ID information exists. Even external bus resets occurring between the first and the second self ID phase can be handled. Two storage means capable of storing a certain number of registers can be realized in hardware easily and with low cost.

Preferably, the interface link layer device comprises means for initiating a new self ID phase as soon as said write access is completed, with the content of the storage means to which said write access has been directed being used for setting up the self ID packets in said new self ID phase. The storage means to which said write access has been directed contain the actual information about the configuration of the remote sub networks. By initiating a self ID as soon as the write access is terminated, the whole network's configuration can be updated as quickly as possible.

Preferably, the interface link layer device comprises means for resetting the local bus of said first sub network as soon as said write access is completed. After resetting the local serial bus, a new self ID phase has to be performed, and thus the network configuration is updated.

According to a first preferred embodiment of the invention, write accesses are directed to said first storage means, and read accesses in order to set up self ID packets are directed to said second storage means. While the first storage means contain provisional data, which might be incomplete, the valid self ID information is always kept in the second storage means. The advantage of this first preferred embodiment of the invention is that the read and write paths do not have to be switched.

Preferably, an interface link layer device according to the first embodiment comprises means for copying the contents of said first storage means to said second storage means as soon as the write access to said first storage means is completed. When the information about the actual network configuration, which is accumulated in the first storage means, is complete, it is transferred to the second storage means, which always contain the valid self ID information. As the amount of data that has to be copied is small, copying does not take much time.

According to a second preferred embodiment of the invention, write accesses are alternatingly directed to said first and said second storage means, and read accesses in order to set up self ID packets in a self ID phase are directed to the storage means to which no write accesses are directed. In this embodiment, no copy operation is required. As soon as data about the configuration of remote sub networks has been completely written to one of the storage means, said data is declared valid and is used for setting up self ID packets. Further write accesses are directed to the respective other storage means.

Preferably, an interface link layer device according to the second embodiment comprises register means for indicating to which of said first and said second storage means a write access for writing information about said second sub network's configuration is to be directed. Further preferably, an interface link layer device according to the second embodiment comprises register means for indicating which of said first and said second storage means contains valid self ID information for setting up the self ID packets in a self ID phase. In the second embodiment, by means of a few additional registers, it is possible to keep track of which storage means hold the valid data, and to which storage means a write access is to be directed to.

Preferably, said first and said second storage means are realized as register arrays in hardware. The IEEE 1394 standard defines strict timing requirements for the self ID phase. When said storage means are realized in hardware, the physical layer of the interface link layer device can access the self ID information with very low latency.

Preferably, at least some of the entries into said first and said second storage means comprise information about the tree structure of said second sub network. Thus, the interface link layer device can simulate the hierarchical structures of other sub networks which are connected to the long delay link. This leads to a further increase in network transparency.

Preferably, an interface link layer device according to the invention supports long delay links which are based on coaxial cables, wireless, infrared, asynchronous transfer mode, unshielded twisted pair and/or plastic optic fibre connections. By means of interface link layer devices acting as bridging devices, a wide range of connection technologies becomes available for IEEE 1394 device networks, and the flexibility of such networks is increased.

Preferably, an interface link layer device according to the invention is adapted to the IEEE 1394 standard. Self-establishing device networks, which are used for home applications such as video or audio applications as well as for business applications are most often realized according to the IEEE 1394 standard.

Further features and advantages of preferred embodiments according to the present invention will be explained below in conjunction with the accompanying drawings, in which.

Figure 1:
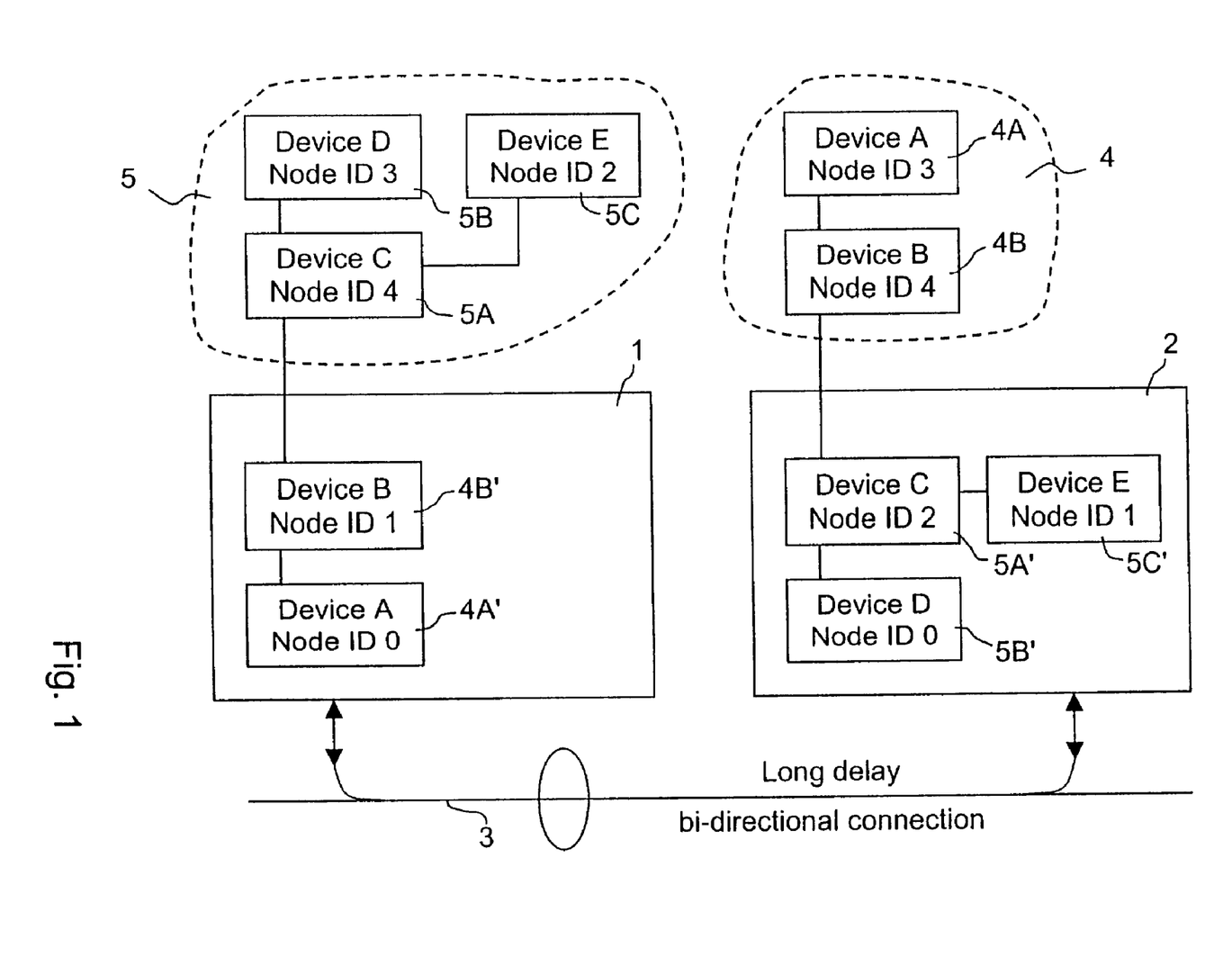
FIG. 1 shows a block diagram of a device network comprising a long delay link and two interface link layer devices.

FIG. 1 shows an IEEE 1394 network comprising a first sub network 5 and a second sub network 4 which are connected with each other by a long delay bi-directional connection 3. In-between the first sub network 5 and the long delay bi-directional connection 3 a first interface link layer device 1 is arranged which is allocated to and therefore regarded to belong to the first sub network 5, i.e. which behaves like a network device or node within the first sub network 5. Similar, a second interface link layer device 2 is connected in-between the second sub network 4 and the long delay bi-directional connection 3 which is allocated to and therefore regarded to belong to the second sub network 4.

The long delay link 3 through which the interface link layer devices communicate might be a coaxial cable, a wireless, an infrared, an asynchronous transfer mode (ATM) which is used for professional long distance, high speed data connections, an unshielded twisted pair (UTP), a plastic optic fibre (POF) and/or another appropriate connection, e.g. a combination of the aforesaid types of connections. Such a connection is assumed to be static.

In the shown example the first sub network 5 comprises three nodes, namely a first node 5A which is named device C, a second node 5B which is named device D, and a third node 5C which is named device E. Further, the second sub network 4 comprises a fourth node 4A which is named device A and a fifth node which is named device B.

Each of the first interface link layer device 1 and the second interface link layer device 2 has the feature to transmit information about its own sub network 5, 4 to the respective other interface link layer device 2, 1 and based on information received from the respective other interface link layer device 2, 1 simulate the respective sub network 4, 5 the respective other interface link layer device 2, 1 is connected to. Such a simulation is performed by a respective interface link layer device 1, 2 at least during phases with severe timing reqirements, such as the self ID phase during which each node of a sub network identifies itself to the sub network.

Therefore, in the shown example the first interface link layer device 1 which is named interface 1 comprises the virtual fourth node 4A' which is a simulation of the fourth node 4A, namely of the device A, and the virtual fifth node 4B' which is a simulation of the node 4B, namely of the device B. The second interface link layer device 2 which is named interface 2 comprises the virtual first node 5A' which is a simulation of the first node 5A, namely of the device C, the virtual second node 5B' which is a simulation of the second node 5B, namely of the device D, and the virtual third node 5C' which is a simulation of the third node 5C, namely of the device E.

The respective interface link layer device 1, 2 behaves like the number of nodes about which it received information so that new node identifiers are automatically assigned during a self ID phase to the virtual nodes according to the IEEE 1394 standard to secure what within each of the sub networks 5, 4 no conflicts occur.

To be able to properly simulate the respective other sub network, i.e. the respective sub network a respective interface link layer device is connected to, the following initialization procedure is performed:

Initially, the first sub network 5 and the second sub network 4 behave and act as independent networks respectively comprising the network devices and an interface link layer device which acts as a normal network device or network controller. Therefore, in the initial phase during which both interface link layer devices 1, 2 behave like a single node the first sub network 5 knows after a self ID phase that it comprises four nodes, namely the first to third nodes 5A to 5C and the first interface link layer device 1. Since this information is distributed within the whole first sub network 5 also the first interface link layer device 1 is able to collect the necessary information about the network topology of the first sub network 5. Similar, after the initial self ID phase of the second sub network 4 the interface link layer device 2 knows that the second sub network 4 comprises the fourth node 4A, the fifth node 4B, and the second interface link layer device 2.

After such a self ID phase within one of the sub networks 5, 4 during which a respective interface link layer device 1, 2 collected new information such information is distributed via the long delay bi-directional connection 3 to the respective other interface link layer device 2, 1. In the shown example, for performing the self ID phase, this information might comprise the number of nodes connected to a respective sub network and their names. In this way the first interface link layer device 1 gets the information that the second sub network 4 comprises two network devices apart from the second interface link layer device 2, namely the fourth node 4A, i.e. the device A and the fifth node 4B, namely the device B, and the second interface link layer device 2 gets the information that the first sub network 5 comprises three devices apart from the first interface link layer device 1, namely the first node 5A, i.e. the device C, the second node 5B, namely the device D, and the third node 5C, namely the device E.

Preferably, both interface link layer devices 1, 2 should also know the whole network topology, i.e. the topology of each sub network 5, 4.

Finally, after receiving such an information via the long delay bi-directional connection 3 each of the interface link layer devices 1, 2 initiates a second self ID phase within the own connected sub network, e.g. by resetting the local busses 6, 7, which are connected to the interface link layer devices 1, 2. Preferably, the local busses 6, 7 are implemented as serial busses according to the IEEE 1394 standard.

During the second self ID phase which is initiated since the respective interface link layer device received information about another sub network, the interface link layer device 1, 2 which received such information simulates a certain number of nodes according to the information received. In order to perform this task, each of the interface link layer devices 1, 2 comprises a programmable physical layer which simulates the respective virtual nodes. The first interface link layer device 1 simulates the second sub network, namely the fourth device 4A and the fifth device 4B, and the second interface link layer device 2 simulates the first sub network, namley the first to third nodes 5A to 5C. This simulation is performed strictly according to the IEEE 1394 standard, e.g. the first interface link layer device 1 sends two self ID packets to the first sub network 5 and represents two node IDs after the self ID phase. Likewise, the second interface link layer device 2 sends three self ID packets and represents three node IDs after the self ID phase.

A distributed network including a long delay link can be built up compatible with existing IEEE 1394 devices. These devices need not to know that a long delay connection exists when they communicate with a device simulated inside one of the interface link layer devices. Therefore, a distributed IEEE 1394 network including a long delay link is built up which is completely transparent and retaining all the advantages of the IEEE 1394 standard. Of course, the invention can also be applied to other communication standards to set-up long delay links.

Furthermore, an interface link layer device according to the present invention is not limited to a network consisting of two sub networks, but can also comprise three of more sub networks connected to the same long delay bi-directional link 3. In this case the communication on the long delay link 3 may be organized in packets or in channels as described in the (above-referenced) European Patent Application 99 126 221.3 and each interface link layer device simulates two or more sub networks.

In order to store the information about the other sub network, the interface link layer device 1 comprises two register banks, a register bank 0 and a register bank 1. Information about the nodes that are to be simulated by the interface link layer device 1 that is received via the long delay link 3 is written to the register bank 0. Therefore, the node controller of the interface link layer device 1 possesses a write access to the register bank 0. In case of a bus reset occurring during the write access to the register bank 0, the data for setting up the self ID packets issued by the interface link layer device 1 must not be read from the register bank 0. because the content of the register bank 0 may still be incomplete. According to the invention, a second register bank, the register bank 1, is provided, and the information for setting up the self ID packets is obtained from this register bank 1. By providing at least two register banks, it is possible to maintain a well-defined network structure at each point of time.

Figure 2:
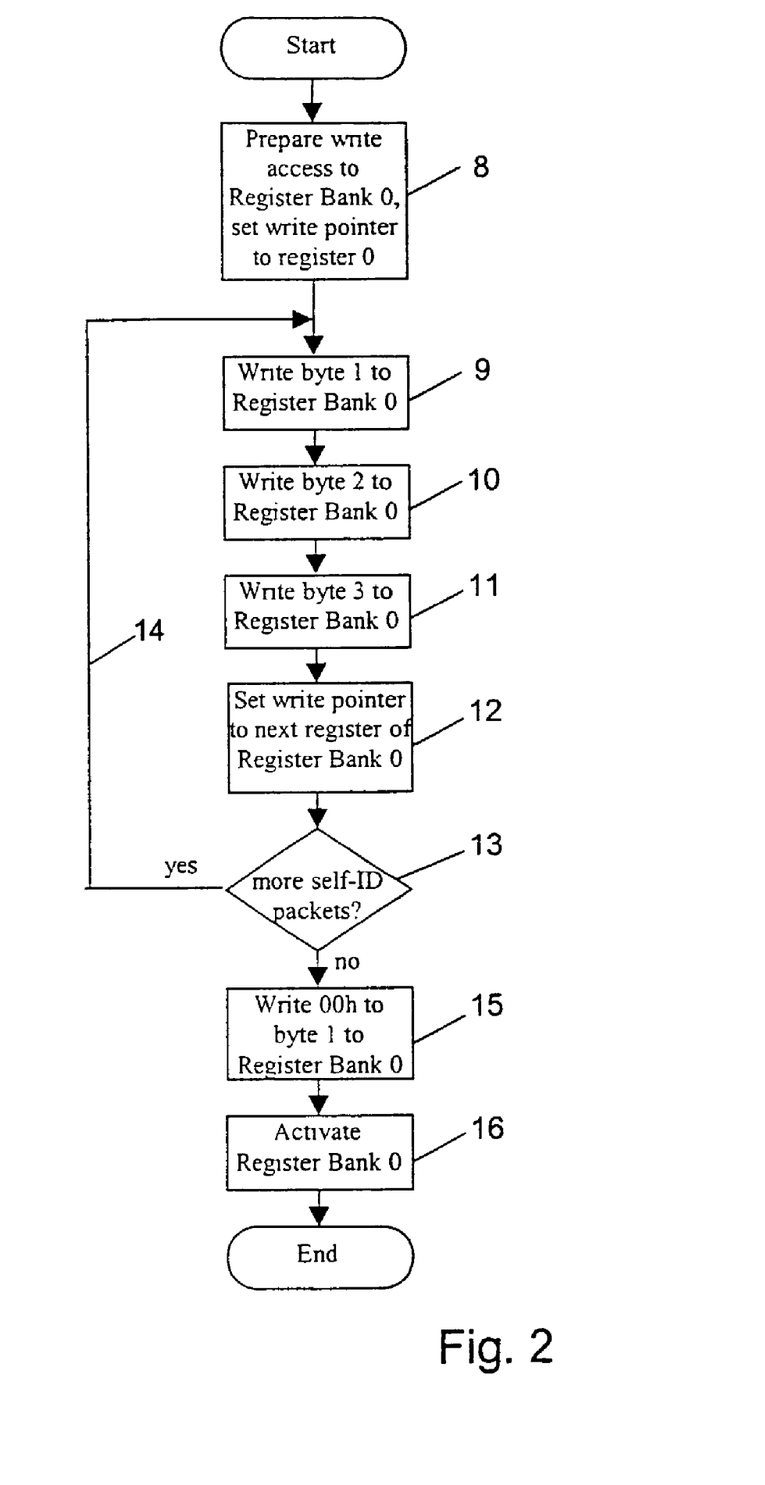
FIG. 2 shows a flow chart depicting how the write access to the register bank 0 is effected.

In FIG. 2, it is shown how the information required for setting up the self ID packets for the virtual nodes is written to the register bank 0. In step 9, the write access to the register bank 0 is prepared, and the write pointer is set to the register 0 in order to indicate the first entry position of the register bank 0. Each register of the register bank 0 comprises 3 bytes (24 bit). In step 9, Byte 1 is written, in step 10, Byte 2 is written, and in step 11, Byte 3 is written to the register bank 0. Bytes 1 to 3 are written in a byte-wise manner in steps 9 to 11 to be complient with the interface according to the IEEE 1394 standard-annex J (File Link Interface Specification). In step 12, the write pointer is set to the next register of the register bank 0. In step 13, it is asked whether more self ID packets have to be written to the register bank 0. If this is the case (14), the respective Bytes 1, 2, 3 are written to the respective entry position of the register bank 0. As soon as all the self ID packets which the interface link layer device has to send during a self ID phase have been accommodated in the register bank 0, the value "00h" is written, in step 15, to the next register of the register bank 0. The register bank 0 now contains the complete information for performing a self ID phase. In step 16, the register bank 0 is actived, which means that starting from this point of time, the content of register bank 0 is used for setting up the self ID packets in case of a bus reset.

Figure 3:
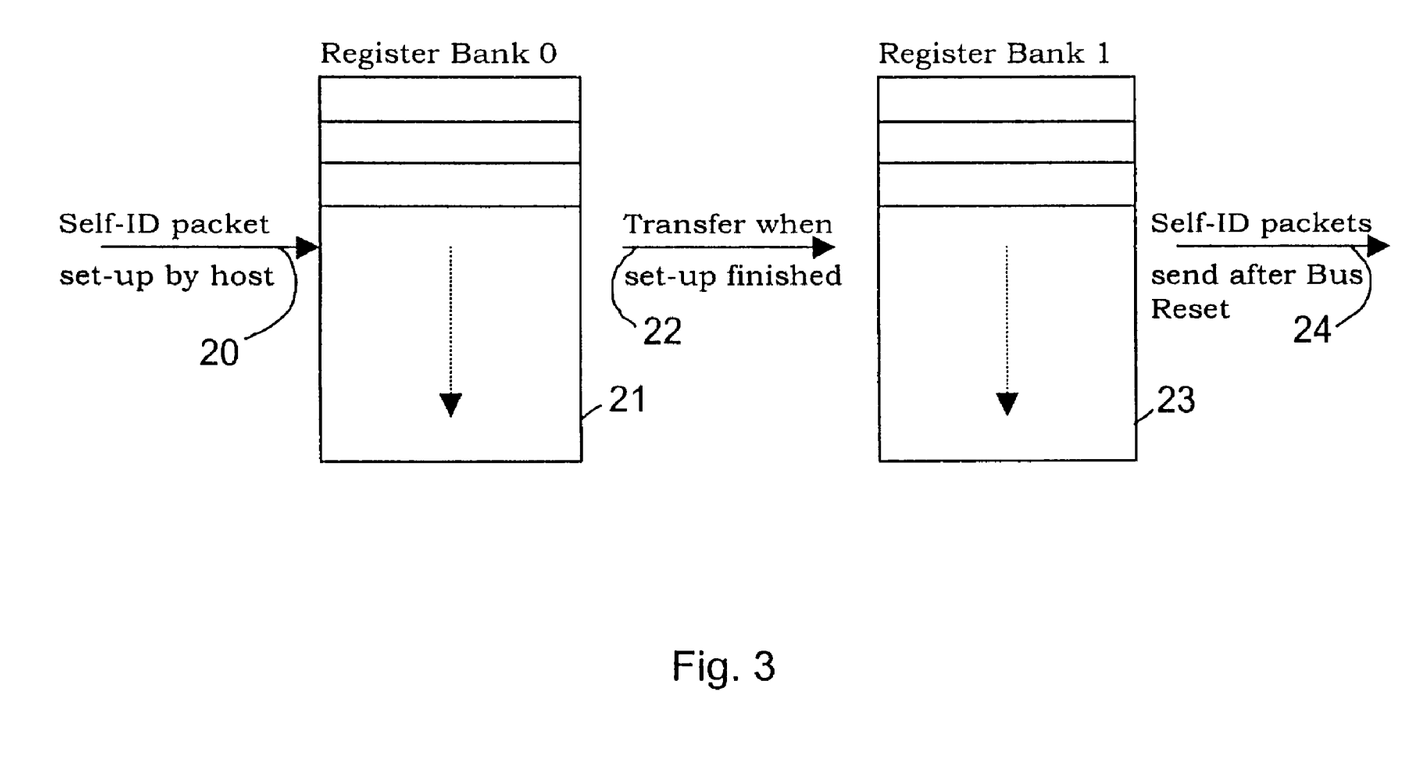
FIG. 3 shows how the content of register bank 0 is copied to the register bank 1 when the write access is completed.

In FIG. 3, a first embodiment of the invention is shown, in which the register bank 0 (21) is activated by copying (22) its content to the register bank 1 (23). In this embodiment, whenever a bus reset occurs, the content of register bank 1 (23) is accessed (24) in order to obtain the information required for forming the self ID packets during the self ID phase. The write access 20 for writing the information about the nodes to be simulated is directed to the register bank 0 (21). As soon as all the information required for the self ID packets has been written to the register bank 0 (21), all the entries of register bank 0 (21) are copied (22) to the register bank 1 (23). Any external request for a bus reset occurring during the copy operation is ignored. When the copying has been finished, a self ID phase is initiated, and the interface link layer device 1, 2 sends the packets specified by the entries of the register bank 1 to its sub network 5, 4. The interface link layer device 1, 2 can initiate the self ID phase by causing a bus reset on its local bus 6, 7. Preferably, the local bus 6, 7 is a serial IEEE 1394 bus.

According to a second embodiment of the invention, for each of the register banks 0 and 1, a bit "write access allowed" is stored in a dedicated write access register. When the bit "write access allowed" for the respective register bank is set, a write access to said register bank is allowed. Furtheron, for each of the register banks 0 and 1, a further register indicating whether the content of the respective register bank is valid for the self ID phase is provided. When the bit "valid for self ID" is set, the content of the respective register bank is complete and can be used for setting up the self ID packets. In case the bit "write access allowed" is set for a first register bank, the bit "valid for self ID" of the first register bank must not be set, because the content of said register bank may still be modified.

As soon as the write access to a first register bank is completed, the bit "write access allowed" is reset, and the bit "valid for self ID" is set. At the same point of time, the bit "write access allowed" for the respective other register bank is set, and the bit "valid for self ID" for this other register bank is reset. Thus, the write accesses are directed to the two register banks in an alternating mode. The content of the respective register bank to which no write access is allowed is used for setting up the self ID packets during the self ID phase. In the implementation of the second embodiment as described, four additional registers (two registers per register bank) are required. It is possible to implement this second embodiment with two additional registers (one register per register bank). One could even think of an implementation where only one additional register is provided for the two register banks, indicating which of the two register banks contains valid data for setting up the self ID packets.

In each interface link layer device, the self ID phase is controlled by the programmable physical layer of the interface link layer device. In the IEEE 1394 standard, severe timing requirements are defined for sending and receiving self ID packets. In order to meet these timing requirements and to avoid timeout errors, the register banks should preferably be realized as register arrays in hardware. When the programmable physical layer accesses these hardware arrays, the access times are sufficiently low to meet the timing requirements defined in the IEEE 1394 standard.

The data structure of the self ID packets is described in the IEEE 1394 standard. Each self ID packet consists of four bytes followed by a four byte checksum which is the logical inverse of the first 32 bits. The first byte of the self ID packet includes a two bit packet indentifier and a six bit physical ID. These two values are automatically set by the programmable 1394 physical layer when the self ID packet is sent. The other three bytes will be taken from the respective register bank, e.g. from the register bank 0.

In the following example 1, which refers to FIG. 1, a data structure which is contained in one of the register banks will be described. The interface link layer device 1 has to simulate the devices A and B of the local bus 7 and both devices have not more than three ports. First the controller of the interface link layer device 1 prepares the write access to the respective register bank, e.g. to the register bank 0. The preparation for write access also resets the register bank 0.

Next the controller of the interface link layer device 1 writes with three write cycles (one byte per cycle) the content of the first self ID packet for simulating device A into register 0 of the register bank 0. Then the controller writes with another three write cycles the content of the second self ID packet for simulating device B into register 1 of the register bank 0.

Figure 4A:
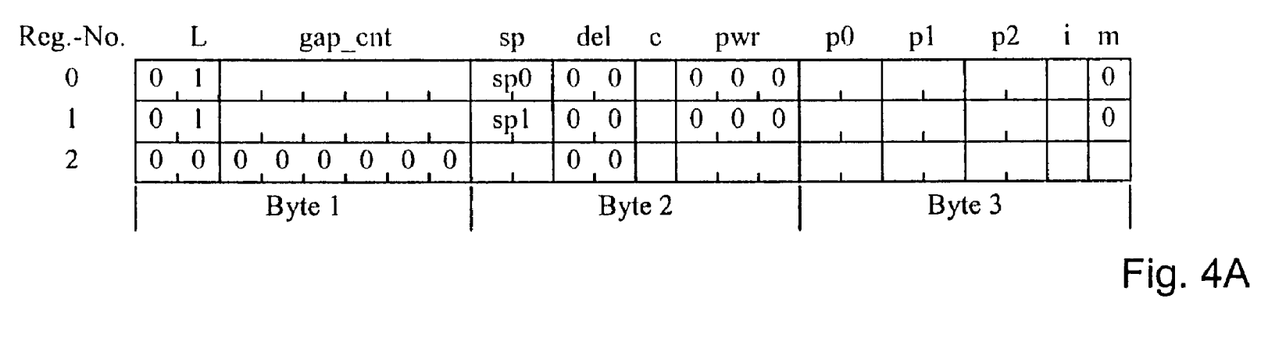
FIG. 4A shows the register setup of the register bank 0 for example 1.

The register setup of the register bank 0 is shown in FIG. 4A. For both self ID packets the value of gap_cnt will be inserted by the programmable 1394 physical layer from ist gap_count register. The values sp0 and sp1 specify the speed values of the two simulated devices. The value for del is fixed to "00", and the value for pwr is set to zero, which indicates that the respective node does not need bus power and that it does not repeat power. The values of the ports p0, p1, p2 are set such that each node controller of the 1394 serial bus can create a correct tree architecture of the 1394 serial bus therefrom. The values of c and i are set by the software of the controller of the interface link layer device 1. while the value of m must be set to zero because there is no second self ID packet following for the simulated device A. This means that both devices are completely identified by a single self ID packet. Because of the gap_cnt value of 000000b in register 2, byte 1, the programmable 1394 physical layer will recognize that there are only two self ID packets.

According to the first embodiment of the invention, the data of register bank 0 will be transferred to register bank 1. After the next bus reset on the 1394 serial bus, the new self ID packets will be sent on the 1394 serial bus.

Figure 4B:
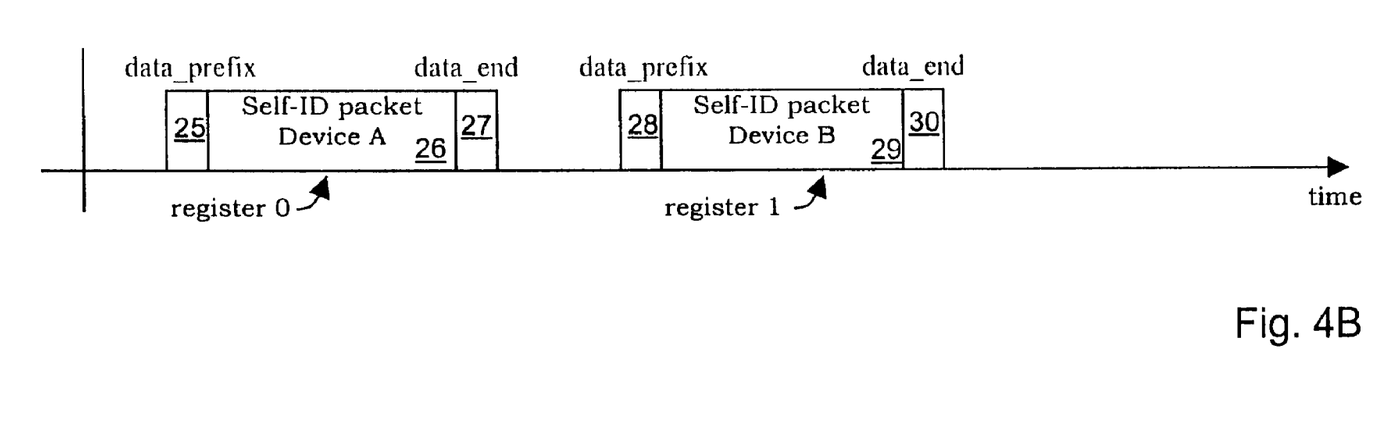
FIG. 4B gives the structure of the self ID packets according to example 1.

The structure of the self ID packets according to example 1 is shown in FIG. 4B. First, a data_prefix 25 is sent, and then, the self ID packet 26 for device A, comprising a packet identifier, a physical ID and the content of register 0 (3 bytes) is transmitted. Finally, the data_end 27 is sent.

The next data packet comprises a data_prefix 28, a self ID packet 29 for device B, and a data_end 30. The self ID packet 29 for device B consists of a packet identifier, a physical ID and the content of register 1.

In the following example 2, which also refers to FIG. 1, a second data structure which is contained in one of the register banks will be described. Again, the interface link layer device 1 has to simulate the devices A and B of the local bus 7, but in this example device A has six ports, while device B again has three ports. For this reason the controller of the interface link layer device 1 has to set up three self ID packets. Two of them, one of type 0 and one of type 1. identify the device A. The third self ID packet simulates device B.

Figure 5A:
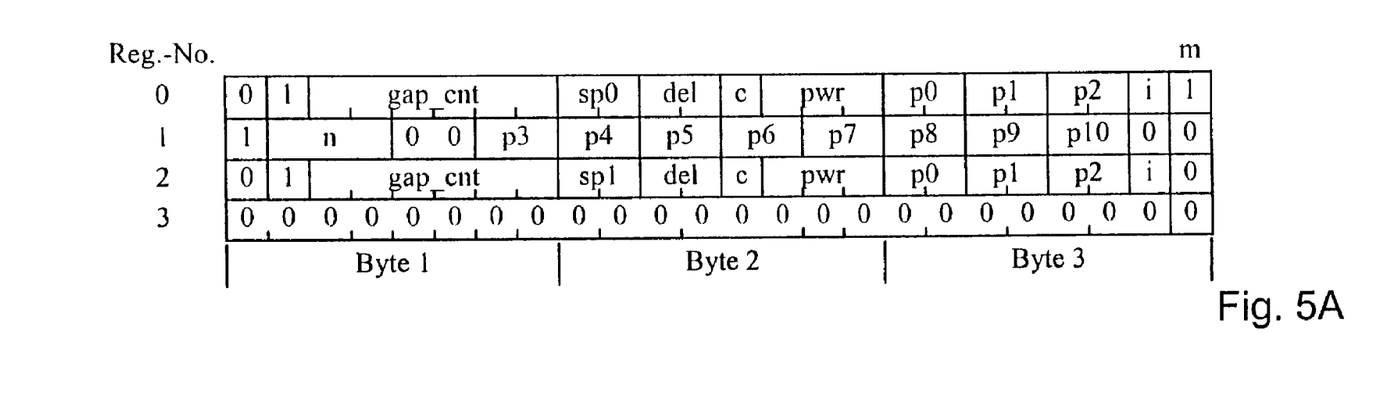
FIG. 5A shows the register setup of the register bank 0 for example 2.

First the controller of the interface link layer device 1 enables the register bank 0 to set up the self ID packets. Next said controller writes with three write cycles (byte 1 to byte 3) the first self ID packet of device A, which is a self ID packet of type 0, to register 0 of the respective register bank, e.g. of register bank 0. Then, with another three write cycles, the second self ID packet of device A, which is a self ID packet of type 1, will be written to register 1 of register bank 0. Next, the single self ID packet for device B is written to register 2 of the register bank 0. In register 3, the gap_cnt value (byte 1, bits 0 to 5) is set to 000000b. Thus, the programmable 1394 physical layer can identify that there are no more valid self ID packets following the three programmed self ID packets.

The resulting data structure is shown in FIG. 5A. In the last column of this data structure, the bit m (least significant bit of each self ID packet) is listed. From the value of this bit, it can be seen how many self ID packets belong to a certain device. If the bit m is set, at least the following self ID packet in the register bank 1 belongs to the same device (self ID packet of type 1). Otherwise, if the bit m is set to zero, the self ID packet in the next register of the register bank 1 belongs to the next simulated device (self ID packet of type 0).

Accordingly, the bit m in register 0 is set, and the programmable 1394 physical layer recognizes that there are two self ID packets for device A. The value of m in register 1 is set to zero in order to identify this self ID packet as the last self ID packet for device A. The values p3 to p6 corresponding to port 3 to port 6 of the six port device A are set to values such that every node on the 1394 serial bus can create a correct tree architecture of the 1394 serial bus. For the six port device A, the values for p7 to p10 should be set to zero, which indicates that the respective port is not present.

Figure 5B:
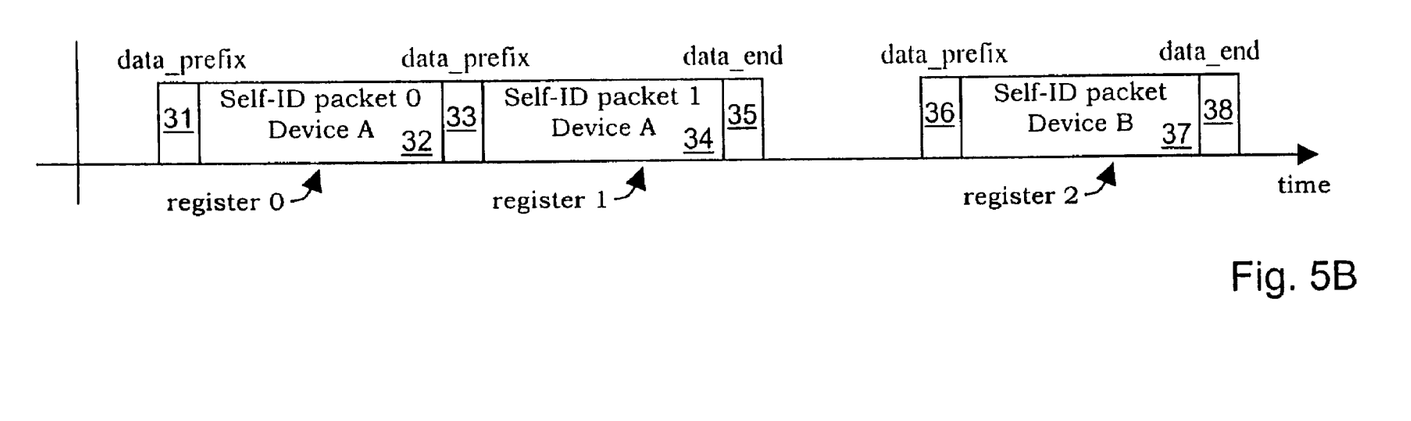
FIG. 5B gives the structure of the self ID packets according to example 2.

According to the first embodiment of the invention, the data of register bank 0 will be transferred to register bank 1. After the next bus reset on the 1394 serial bus, the new self ID packets will be sent on the 1394 serial bus. In FIG. 5B, the structure of the self ID packets according to example 2 is shown. Because device A comprises six ports, two self ID packets have to be transmitted which correspond to device A. First, a data_prefix 31 is sent, and then, the self ID packet 32 for device A is transmitted. The self ID packet 32 is a self ID packet of type 0 and comprises the content of register 0 of the register bank 1. Next, the data_prefix 33 and the self ID packet 34 are transmitted. The self ID packet 34 is a self ID packet of type 1 and comprises the content of register 1 of the register bank 1. Finally, the data_end 35 is sent. In order to simulate device B, a data_prefix 36, a self ID packet 37, and the data_end 38 are sent.

The programmable 1394 physical layer is able to simulate up to 62 nodes. This is sufficient, because the maximum number of devices connected to a 1394 serial bus is 63. The number of self ID packets for a single node depends on the number of ports a node has. The maximum number of self ID packets for a device supporting the 1394 standard is four. For a device which supports the 1394a standard the maximum number of self ID packets is five. So in total each of the register banks should provide a register space of 930 bytes (62 nodes*5 self ID packets*3 bytes).

Figure 6:
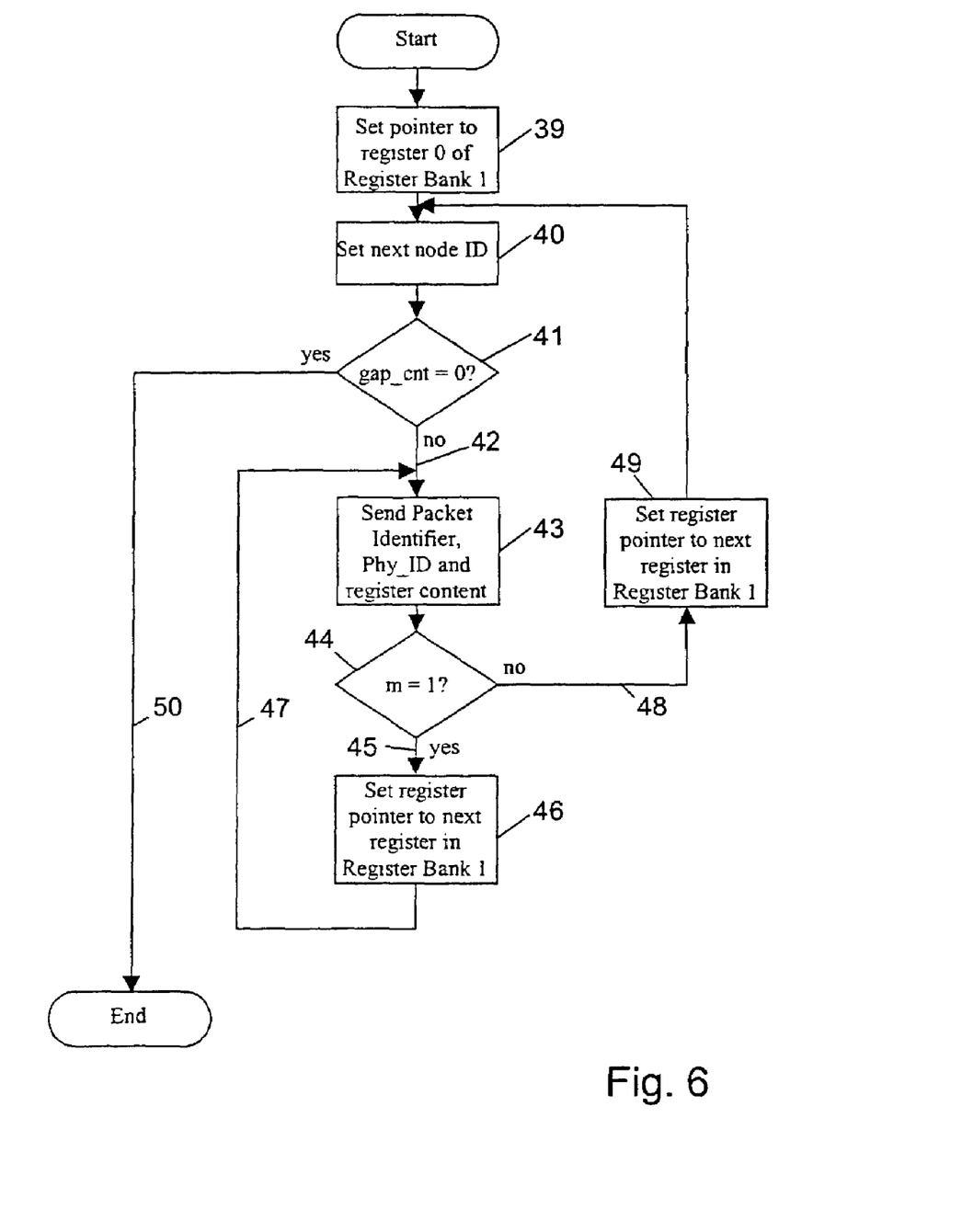
FIG. 6 shows how the self ID information contained in the respective register bank is used for issuing self ID packets.

In FIG. 6, it is shown how the content of the register bank which contains valid self ID information is used for setting up and sending the self ID packets in a self ID phase. Such a self ID phase is initiated whenever a bus reset occurs on the local bus. The interface link layer device sends a set of self ID packets on the local bus in order to simulate a set of virtual nodes. When the self ID phase is initiated, the read pointer is set to register 0 of the respective register bank, e.g. to register 0 of the register bank 1. In the following step 40, the node ID of the next virtual node which is to be simulated is set. From the next register of the respective register bank, the gap_cnt value of the next node is read. In step 41, it is checked whether this gap_cnt value is equal to zero or not.

In case the gap_cnt value is not equal to zero (42), there are further nodes which have to be simulated, and therefore, further self ID packets have to be sent. In step 43, the packet identifier, the physical ID and the register content are sent, whereby the packet identifier and the physical ID are automatically set by the programmable 1394 physical layer. In the next step 44, it is determined whether the bit m, which is the least significant bit of the actual register, is set or not. In case the bit m is set (45), another self ID packet has to be sent for the virtual node that is to be simulated. In this case, the register pointer is set, in step 46, to the next register in the register bank. The content of said register is read and transformed into a self ID packet, which is sent to the local bus (47, 43).

In case the bit m is not set (48), no more self ID packets have to be sent for the actual virtual node. In step 49, the register pointer is set to the next register in register bank 1, and in step 40, the node ID is set to the next virtual node that has to be simulated by the interface link layer device. The read accesses to the register bank and the transmission of self ID packets are continued until a gap_cnt value of zero is encountered in step 41. In this case, the physical layer has sent all the self ID information contained in the register bank, and the procedure is ended (50).

The invention claimed is:

1. An interface link layer device connected in-between a first sub network and a long delay link to which at least one second sub network is connected, wherein said interface link layer device comprises:
   at least first storage means and second storage means for storing self ID information, received via the long delay link, regarding a configuration of said second sub network, wherein said self ID information is written to either one of said storage means during a write access, wherein if a new self ID phase is initiated before write access is completed, the content of the respective other storage means is used for setting up the self ID packets, and wherein if the new self ID phase is initiated as soon as or after said write access is completed, the content of the storage means to which said write access has been directed is used for setting up the self ID packets; and
   a programmable physical layer for simulating nodes of said second sub network, for controlling said self ID phase, and for accessing said at least first and second storage means.

2. The interface link layer device according to claim 1, further comprising:
   means for initiating a new self ID phase as soon as said write access is completed, with the content of the storage means to which said write access has been directed being used for setting up the self ID packets in said new self ID phase.

3. The interface link layer device according to claim 1, further comprising:
   means for resetting the local bus of said first sub network as soon as said write access is completed.

4. The interface link layer device according to claim 1, wherein write accesses are alternatively directed to said first and said second storage means, and read accesses in order to set up self ID packets in a self ID phase are directed to the storage means to which no write accesses are directed.

5. The interface link layer device according to claim 4, further comprising:
register means for indicating to which of said first and said second storage means a write access for writing information about said second sub network's configuration is to be directed.

6. The interface link layer device according to claim 4, further comprising:
register means for indicating which of said first and said second storage means contains valid self ID information for setting up the self ID packets in a self ID phase.

7. The interface link layer device according to claim 1, wherein said first and said second storage means are realized as register arrays in hardware.

8. The interface link layer device according to claim 1, wherein at least some of the entries into said first and said second storage means comprise information about the tree structure of said second sub network.

9. The interface link layer device according to claim 1, wherein the link layer device supports long delay links which are based on coaxial cables, wireless, infrared, asynchronous transfer mode, unshielded twisted pair and/or plastic optic fibre connections.

10. The interface link layer device according to claim 1, wherein the link layer device is adapted to an IEEE 1394 standard.

11. A device network comprising at least one interface link layer device according to claim 1.

12. An interface link layer device connected in-between a first sub network and a long delay link to which at least one second sub network is connected, wherein said interface link layer device comprises:
at least first storage means and second storage means for storing self ID information received via the long delay link, regarding a configuration of said second sub network, wherein said information is written to said first storage means, wherein if a new self ID phase is initiated before write access is completed, the content of the second storage means is used for setting up the self ID packets, and wherein if the new self ID phase is initiated as soon as or after said write access is completed, the content of said first storage means is used for setting up the self ID packets; and
a programmable physical layer for simulating nodes of said second sub network, for controlling said self ID phase, and for accessing said at least first and second storage means.

13. The interface link layer device according to claim 12, further comprising:
means for copying the contents of said first storage means to said second storage means as soon as the write access to said first storage means is completed.

14. A method for maintaining a well-defined status in a device network, said device network comprising a first interface link layer device that is connected in-between a first sub network and a long delay link to which at least one second sub network is connected, said first interface link layer device comprising first and second storage means for storing self ID information, the method comprising:
writing the information about the second sub network's configuration received via the long delay link to either one of said storage means, wherein if a self ID phase is initiated before the write access is completed, the content of the respective other storage means is used for setting up the self ID packets in said self ID phase;
as soon as the information about the second sub network's configuration has been completely written, initiating a new self ID phase;
performing said new self ID phase, wherein the content of said storage means to which said writing has been directed is used for setting up the self ID packets in said new self ID phase; and
controlling said self ID phase and accessing said first and second storage means by a programmable physical layer for simulating nodes of said at least one second subnetwork.

15. The method according to claim 14, wherein said new self ID phase is initiated by resetting the local bus of said first sub network.

16. The method according to claim 14, wherein write accesses are alternatingly directed to said first and said second storage means, and read accesses for setting up self ID packets in a self ID phase are directed to the storage means to which no write accesses are directed.

17. The method according to claim 16, further comprising:
indicating to which of said first and said second storage means a write access for writing information about said second sub network's configuration is to be directed.

18. The method according to claim 16, further comprising:
indicating which of said first and said second storage means contains valid self ID information for setting up the self ID packets in a self ID phase.

19. A method for maintaining a well-defined status in a device network, said device network comprising a first interface link layer device that is connected in-between a first sub network and a long delay link to which at least one second sub network is connected, said first interface link layer device comprising first and second storage means for storing self ID information received via the long delay link regarding the configuration of said second sub network, the method comprising:
writing the information about the second sub network's configuration received via the long delay link to said first storage means, wherein if a new self ID phase is initiated before the write access is completed, the content of said second storage means is used for setting up the self ID packets in said new self ID phase;
wherein if the new self ID phase is initiated as soon as the information about the second sub-network's configuration has been completely written to said first storage means in said write access, the content of said first storage means is used for setting up the self ID packets in said new self ID phase;
performing said new self ID phase; and
controlling said self ID phase and accessing said first and second storage means by a programmable physical layer for simulating nodes of said at least one second subnetwork.

20. The method according to claim 19, further comprising:
copying the contents of said first storage means to said second storage means as soon as the information about the second sub network's configuration has been completely written.

* * * * *